Figures 1, 6:
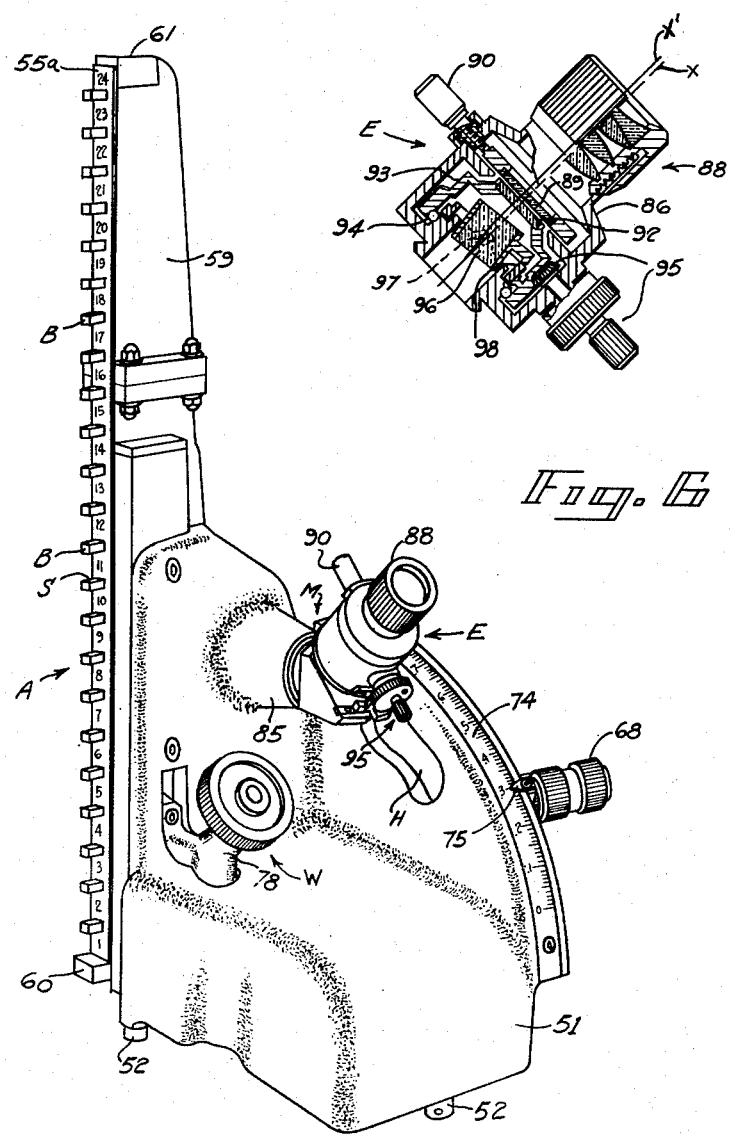

Jan. 14, 1958     G. D. WEBBER     2,819,530
DISTANCE MEASURING INSTRUMENTS
Filed Dec. 6, 1956     3 Sheets-Sheet 1

INVENTOR.
GEORGE D. WEBBER
BY
ATTORNEY

Jan. 14, 1958  G. D. WEBBER  2,819,530
DISTANCE MEASURING INSTRUMENTS
Filed Dec. 6, 1956  3 Sheets-Sheet 2
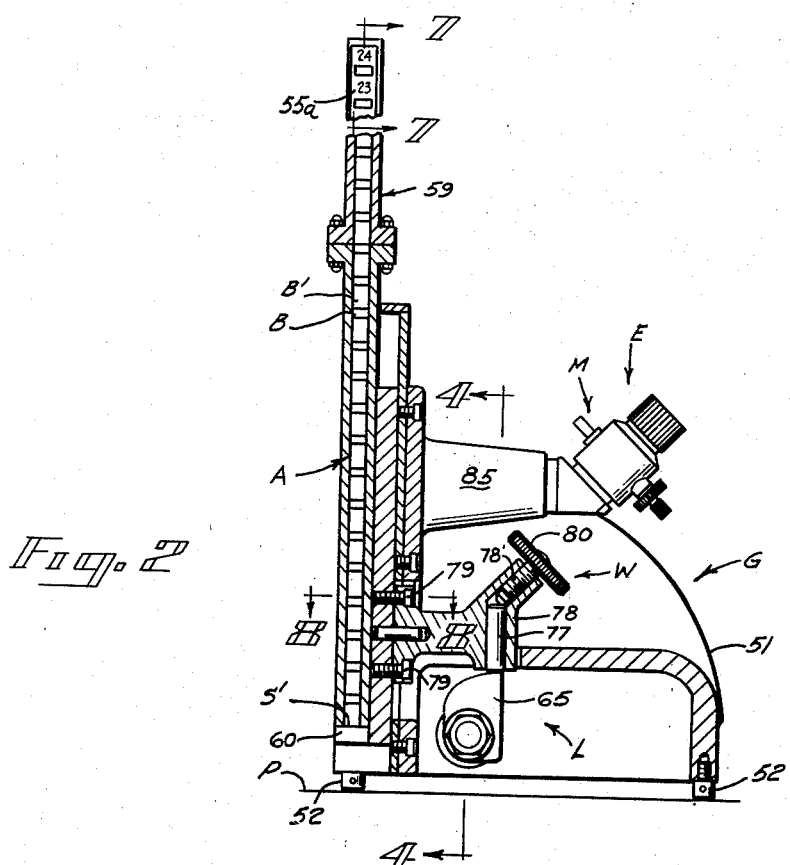
Fig. 2
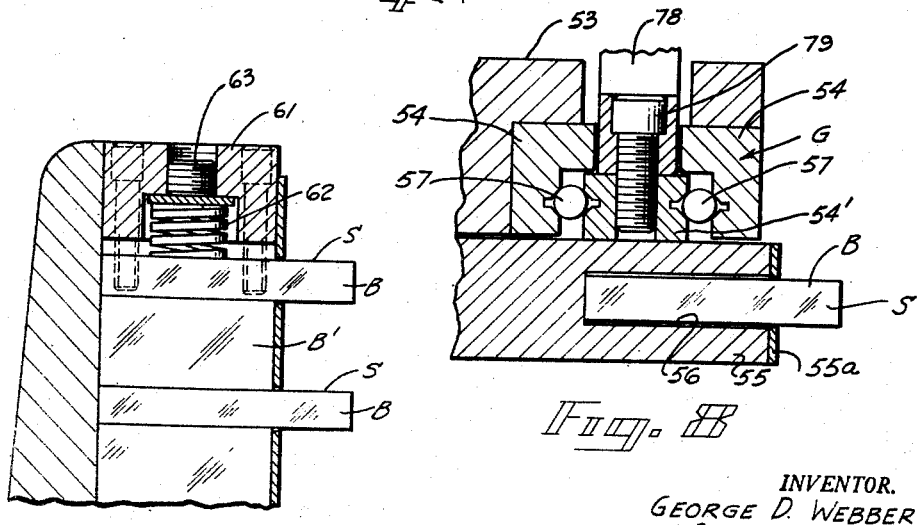
Fig. 7
Fig. 8
INVENTOR.
GEORGE D. WEBBER
BY
ATTORNEY Jan. 14, 1958
G. D. WEBBER
2,819,530
DISTANCE MEASURING INSTRUMENTS
Filed Dec. 6, 1956
3 Sheets-Sheet 3
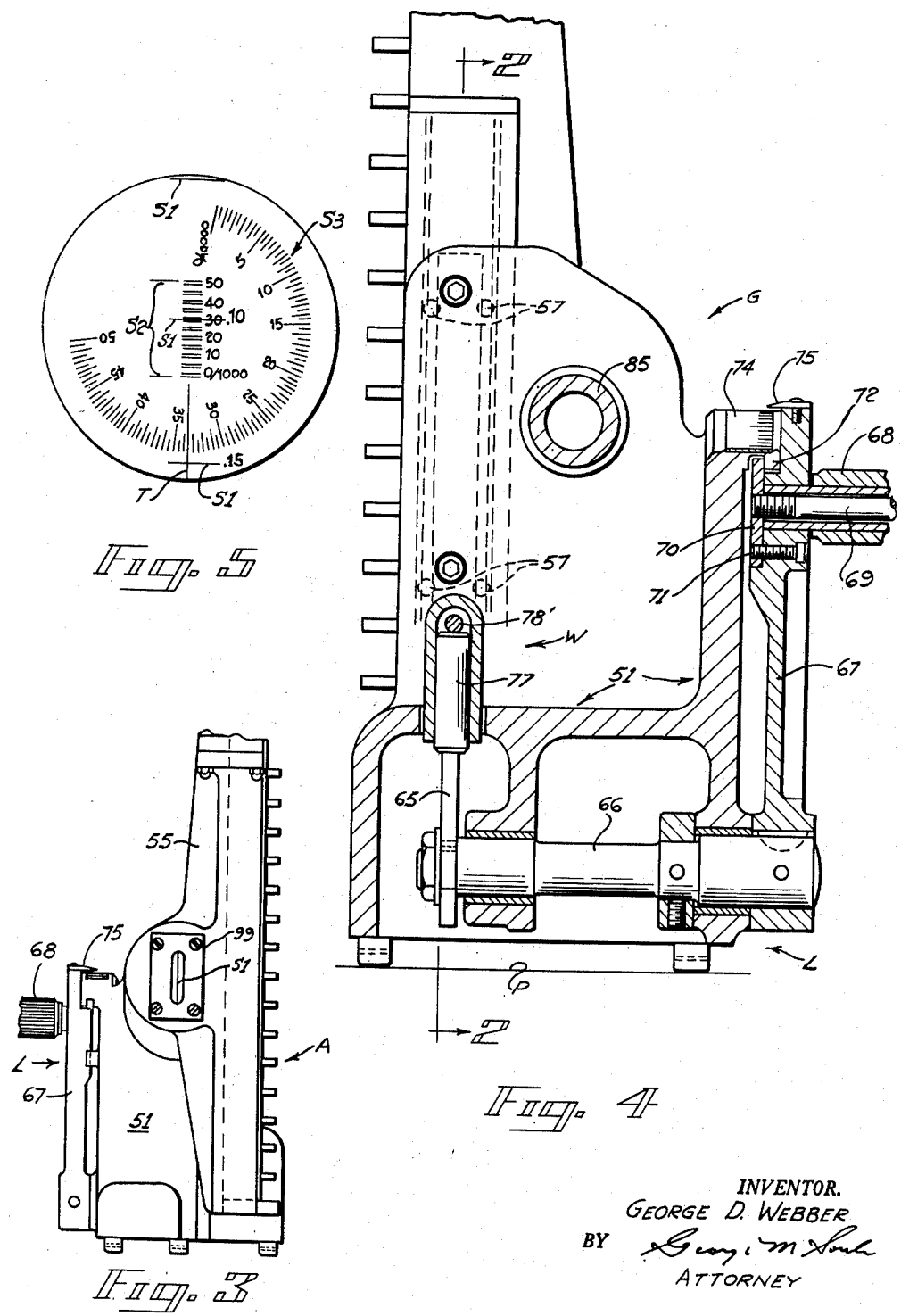
INVENTOR.
GEORGE D. WEBBER
BY
ATTORNEY

United States Patent Office 2,819,530
Patented Jan. 14, 1958

2,819,530

DISTANCE MEASURING INSTRUMENTS

George D. Webber, Lakewood, Ohio, assignor to Webber Gage Co., Cleveland, Ohio, a copartnership Application December 6, 1956, Serial No. 626,695

15 Claims. (Cl. 33—169)

The invention relates to a distance measuring instrument, and, as shown, is embodied in a height gage which can be used as by manufacturers of precision parts to make extremely accurate vertical measurements over a wide range of heights in a small fractional part of the time required by previously available height gages of similar class and with greater fidelity or accuracy. The new principles hereof can, of course, be used for measurement horizontally or in any other direction from a base or reference surface.

The invention, in the illustrative form disclosed hereby, provides a height measuring or establishing instrument having a measuring bar with a series of selectable steps or checking surfaces in fixed fiducial unit distance relationship, any selected step surface being movable quickly (as with reference to a surface plate supporting the gage and the work or a comparitor instrument) to predetermined microscopically small fractions of the unit distance. The gage surface settings are directly and clearly readable by the workman in a single convenient location without requirement of painstaking calculations or timestaking micrometer operations.

In the accompanying drawings, Fig. 1 is a perspective generally front view of a height gage embodying the invention; Fig. 2 is a side elevation of the gage partly shown in vertical cross section as indicated at 2—2 on Fig. 4; Fig. 3 is a fragmentary rear elevation of the gage in the same scale as Fig. 2; Fig. 4 is a relatively enlarged scale front view partly in vertical cross section as along the line 4—4 on Fig. 2; Fig. 5 is a view showing typical scale graduation relationships as displayed in the eyepiece of a preferred form of measuring microscope forming part of the present gage assembly; Fig. 6 is a largely schematic sectional view of the ocular assembly portion of the microscope, and Figs. 7 and 8 are relatively enlarged scale detail sectional views taken as indicated respectively at 7—7 and 8—8 on Fig. 2.

Heretofore available height gages of the class or type having a series of reference steps on a measuring bar spaced apart one measuring unit distance (e. g. one inch) require micrometer type or screw-operated adjustment means movable through the unit distance. The micrometer screw or drum threads become inaccuate due to wear and the necessary manipulations thereof for full range or unit distance movement of the reference steps takes considerable time. In the present subject height gage G in the principal views the measuring bar element, shown as an operatively rigid assembly A comprising essentially a stack of high fidelity gage blocks B and B' held firmly together under strong spring pressure (as will be described particularly in reference to Fig. 7) and the stack can be very quickly adjusted through the entire unit distance range and be temporarily locked in approximate-heightestablishing position of the steps, and an image of one or more fine graduations on a high precision target scale (S1, Figs. 3 and 5) on the measuring bar assembly A is scanned by the operator through a measuring microscope M in reference to graduations of a second scale S2, Fig. 5, in the microscope. Thereby the operator is enabled to set the selected step accurately by a fine or precision adjustment means W, Figs. 1 and 2, in equal increments or intervals on the order of a few one thousandths part of the unit distance. Further, the microscope M is arranged to be quickly and accurately preset (for subdivision of the unit distance fractions obtainable visually with nearly absolute accuracy as already mentioned) in increments on the order of one one-hundredth part of the aforesaid fractions (e. g. .00005") or still finer if desired as will be explained. The gage block assembly A is strongly supported on a precisionally formed preloaded ball bearing gib G, Fig. 8, so that, during the making of final height adjustments, the visibly obscured graduations of target scale S1 and further subdividing reference scale lines S2 can be easily moved steadily into registration without overshoot or jiggle.

In Figs. 1 through 4, the main hollow metal frame 51 of the present gage is shown as provided with three hardened supporting foot pieces 52 for contact with a surface plate P, and an upright portion 53 of the frame carries rigid rails 54 forming parts of the above mentioned ball bearing gib assembly as shown by comparison of Figs. 2, 4 and 8. The inner bar element 54' of the gib assembly is secured, as by screws, not shown, to an elongated upright rigid holder 55 having a trough with relatively intersecting surfaces. The trough is shown as an open channel 56 for reception and approximate alignment of the gage blocks B and B'. The thinner blocks B which complement the vertical dimension of the blocks B' to make up one inch extend out of the channel as shown in Fig. 8 to render their step affording fiducial surfaces S (and their similarly fiducial under surfaces) accessible for contact with cooperating reference or comparison instruments (or the work to be measured) in a known manner. The steel balls 57, Figs. 4 and 8, during assembly of the gib components, are suitably preloaded in their V-shaped ways so as to support the channel piece and gage block or measuring bar assembly A for smooth movement vertically the necessary distance.

Extension gage block holder channels such as shown at 59, Fig. 2, operatively similar to the holder 55, are bolted to the holder 55 to enable height gaging at various larger distances above the surface plate P.

The heights of the various steps S above the surface plate, when the measuring bar assembly is in its lowermost position, are identified on a suitable cover plate 55a, as clearly shown in Fig. 1. The first "step" S', as shown in Fig. 2, is precision-formed on a special gage block 60, wider than the blocks B and B', the block 60 being secured rigidly to the holder 55 to form the bottom end wall of the channel 56. The other blocks are stacked in the channel but are not fastened to the holder 55.

A relatively heavy cap piece 61 is suitably secured to the top of the rigid holder 55 for the gage blocks (or to the top of the extension 59 if such extension is provided) and between the cap piece and the topmost gage block B is a strong compression spring 62 whose force acting downwardly against the stack of gage blocks is adjustable, via a vertically disposed screw 63 in the cap piece 61. The various gage blocks have appropriate side clearance in the channel 56 as exaggeratedly shown in Fig. 8. The gage blocks B and/or B' are professionally made very slightly oversize vertically, and the screw 63 is adjusted downwardly to cause the spring force to compress the blocks until the total height of the gage block assembly is substantially an exact number of inches. All the steps S are then professionally inspected for height above the top of block 60 and for relative distance apart. Thereby thermal expansion and contraction of the holder 55 (and its extensions 59 when used) cannot change the established step heights since the set force of the spring 62 remains substantially constant. Thus, for example the holder 55 for the gage blocks can be a suitably stable ferreous casting and the extension channel 59 can be made of light weight metal such as aluminum to minimize top-heaviness of the gage; and the user, under unusual temperature conditions, need only make proper allowance for the relatively low thermal expansion coefficient of the gage block metal. Since the user does not have to touch the gage blocks the human temperature factor (waiting period) ordinarily accompanying the use of gage blocks is eliminated as is also the timestaking job of wringing gage blocks together.

To enable quick approximate adjustments of the gage block surfaces S, as necessary for obtaining fractional total unit dimension settings of the steps S above an established zero setting, a cam and lever mechanism L, Figs. 2 and 4 is used. This comprises, as shown, a contant rise spiral cam 65 fixed to a shaft 66 journalled in portions of the main frame 51 (see Fig. 4), the mechanism including a lever 67 rigid with one end of the shaft 66 lying at one side of the frame. The lever 67 operates through its entire range of required movement in less than half a complete circle as compared to micrometer type primary adjusters requiring many turns for full range movement.

The lever 67 carries a knurled adjusting hand piece 68 of generally cylindrical form near its free end and the handpiece 68 is connected to a clamp screw 69 threaded into a clamping plate 70. One end of the clamping plate is loosely secured to the lever 67 as by a screw 71 and its opposite marginal end surface is designed to be forced against an arcuate flange 72 on the frame 51 as a function of turning the handpiece about the axis of screw 69, whereby to lock the lever in angularly adjusted positions. An arcuate scale 74 on the frame concentric with the shaft 66 is graduated so that movement of a pointer 75 on the lever 67 in reference to the scale 74 shows the approximate portions of the unit distance the cam 65 raises or allows lowering (as by its own weight) the measuring bar assembly A. A suitable hand-hold slot H, Fig. 1, is formed in the web or wall portion of the frame which supports the scale 74.

The quickly adjustable cam 65 (Figs. 2 and 8) operates to elevate the gage block assembly A through contact with a hardened follower pin or push rod 77 which is easily slidable in a mating bore of a rigid bracket 78 secured tightly to the measuring bar assembly as by screws 79 shown as entering the ball bearing gib element 54'. The relatively sliding surface portions of the movable parts are hardened and polished.

For precision adjustment of the fiducial steps S of the measuring bar assembly A the preferred adjusting screw mechanism W includes the follower pin or push rod 77, the top end of which abuts a frusto conical lower end portion of a fine-pitch, hardened screw 78' having a hand wheel 80 in convenient reach of the operator. The handwheel 80, as shown in Fig. 1, is situated at the left of the gage, or at the opposite side of the gage frame 51 from the approximate-height-selecting lever 67 of the measuring bar assembly. The screw 78' extends obliquely of the follower pin axis or at such an angle (e. g. 45°) that a full turn of the handwheel changes the elevation of the measuring bar only about half the axial distance between adjacent screw threads, and the threads are made about as fine as is practicable (e. g. 40 threads per inch).

For convenience in the following discussion of the present subject optical elements the unit dstance between adjacent measuring steps S will be considered to be one inch and the values given as decimals thereof but without the usual signs (″) are illustrative only.

The preferred form of measuring microscope M is suitably mounted on the main frame 51 of the present subject height gage G as in a horizontal tubular portion 85 of the frame 51 aligned with the first or primary measuring or target scale S1 on the vertically movable measuring bar or gage block and holder assembly A. As partially shown or exhibited in Figs. 3 and 5, the first or target scale S1 is preferably a glass plate with hair line precisionally spaced apart graduations. Typical individual-value-identified graduations of scale S1, as magnified in the field of view V of the microscope appear as shown in Fig. 5. The objective and erecting lens system of the microscope are conventional, only the ocular assembly E being shown more or less schematically in Fig. 6.

A second scale S2, in normally fixed position in the ocular assembly E of the microscope as will be further described, is represented in Fig. 5 as its magnified image appears in the field of view V. Double line graduations of the second scale S2 are suitably identified so as to enable subdivision of the (e. g.) .050 intervals of the first scale S1 into tenth parts or other appropriate fractions by precision adjustment of the individually identified first scale graduations from a "zero" or selected point of reference on the second scale S2 to other points on that scale.

The ocular assembly E of the microscope, as shown particularly in Fig. 6, comprises a suitable eyepiece lens assembly 88 and a reticle 89 mounted in the ocular frame 86 transversely of the normal optical axis X for adjustment and initial setting in reference to the highly magnified image of the graduations of the first or target scale S1 as the image of a target scale graduation line is brought into the field of view V through manipulations of the measuring bar positioning mechanisms L or W hereof.

The second scale graduations preferably comprise eleven equally spaced pairs of double lines, every other pair being identified in Fig. 6 as "0," "10," "20" etc. (indicating thousandths parts of an inch). When the zero graduation (not shown) on the first or target scale S1 is brought into register between the doubles lines "0" on the second scale S2, any selected measuring or step surface S of the measuring bar assembly A will be an exact number of inches from the surface plate or base surface P, Figs. 2 and 4. Precision adjustment to accomplish such initial setting can be effected (assuming one of the steps S has been previously set as by gage blocks or equivalent means at the exact unit distance or a multiple thereof above the base surface P) either by the necessary vertical movement of the target scale with refernce to the measuring bar assembly or by movement of the microscope reticle 89 transversely of the normal optical axis of the microscope. Since it is desirable that the series of double line secondary scale graduations be approximately centered in the field of view V, the necessary initial setting just above discussed is preferably done by vertical movement and locking of the first or target scale in approximate position and then by effecting fine adjustment, via movement of the reticle 89, as by means of a captive nut 90 on the ocular framework connected to the reticle, to cause the zero indications of both scale images to coincide or mutually register. The nut 90 is then suitably sealed or locked in fixed position by means not shown.

Assuming the second scale double line graduations on reticle 89 are separated from each other a distance indicating movement of the measuring bar .005 between adjacent pairs of secondary scale lines, it will be evident that the setting of the primary or target scale according to Fig. 5 indicates that the selected step S on the measuring bar assembly A is $n$ inches, Fig. 4, above the surface plate P, plus .030, plus the distance indicated in Fig. 5 by the first scale graduation above the initial setting (i. e. .10); or that the height of the selected step above the surface plate P is $n$ (inches), plus .130.

Finer measurements or step settings than as just described could be obtained solely through use of the first and second scales S1 and S2 as described above by further subdividing (e. g.) the first or target scale S1, but that would tend to confuse the user by presenting more than the necessary number of first scale graduation line images in the field of view V, in reference to the double line second scale graduation images. Superimposition of more than one first scale graduation image on the second scale images would obviously confuse the message.

When finer measurements must be made than are attainable by the optical system as thus far described, the further necessary subdivision of the unit distance is preferably accomplished by the use of a suitably graduated circular scale S3 concentric with the optical axis of the ocular assembly E and mechanically connected to a refractor plate 96 by high reduction drive or equivalent means such that small angular movements of the circular scale S3, easily readable against a suitable fixed reference index T in the field of view, can indicate microscopic equal subdivisions of the distance increments capable of being exhibited by selected associations of the first and second scales S1 and S2.

The third scale S3 for greatest efficiency is inside the ocular of the microscope, as described below, so as to be readable in the field of view V concurrently with the readings obtainable via the first and second scales, as already described, and without having to readjust vision.

In Fig. 6 the circular scale S3 is assumed to be formed on a transparent flat disc 92 mounted on a ring or sleeve 93 which is adjustable about the optical axis of the ocular as on an antifriction bearing assembly 94 in the ocular frame. The sleeve 93 is arranged to be turned in opposite directions by an adjusting knob and gear assembly 95 having relatively small and large portions for coarse and fine adjustment as will be apparent. The parts are self retaining in adjusted position, as by friction. Angular adjustment of the ring or sleeve 93 for the full range of the circular scale (Fig. 5) causes apparent disassociation of any preselected setting of the first and second scale graduations relative to each other through a total (apparent) distance corresponding to the double line graduation spacing, i. e. from the center of one pair of graduation lines on scale S2 to the center of the adjacent pair on that scale.

The means for accomplishing such apparent or visual disassociation is, as shown, the already mentioned transparent refractor plate or body 96 which is pivoted as at 97 to the ocular frame or tube 86, the plate being tilted, as by a fixed, constant rise circular cam 98, from a position parallel to the reticle 89 which bears the double line graduations into various angularly displaced positions (one shown), each corresponding exactly to selected turned positions of the disc 92. Full range adjustment of the rotary scale thus causes a shifting of the optical axis as from X to X', Fig. 6. Thereby, when the circular scale S3 is set at zero not shown but with its first graduation line "0" Fig. 5 on fixed reference or index line T the image of a line of the first scale S1 assumed coincident with the axis of the objective of the microscope will be seen on the optical axis of the ocular; whereas when the disc 92 is rotated counterclockwise to move its scale out of zero position the image of such first scale line will be displaced by refraction along the second scale S2 and the amount of displacement will be indicated by circular scale graduations with reference to the index line T.

If the circular scale is divided into 100 graduations, as shown, then each indicated angular movement of the circular scale S3 from one graduation to another represents a movement of the measuring bar one one-hundredth part of one subdivision of the second scale S2 (center to center of adjacent pairs of double graduation lines on the reticle).

Thus, assuming that the circular scale S3 is set, as in Fig. 5, at 33½ points off zero in the proper direction (counterclockwise for adding to an assumed base value, e. g. .130 as referred to above) and the precision adjustment mechanism W is then operated to bring the graduation .10 to the illustrated position between the second scale double lines identified via indication "30" on the scale by the value .030, the distance of a selected step or measuring surface S' above the surface plate will be $n$ plus .10 (1st scale) plus .030 (of second scale) plus .00335 (third scale). In other words, while the user sees in the field of view of the microscope a relationship of graduation lines of the first and second scale indicating a setting of .130 the actual position of the selected measuring step S has been modified by refractional displacement of the image of the first scale S1 the distance represented by the setting of the third scale S3, so that the proper reading is $n$ inches plus .13335.

The magnified circular scale graduations can be adjusted, by estimation, to equal distances on opposite sides of the index line T, thereby enabling readings to an accuracy of .000025 if desired, which is comparable to the accuracy of measurement obtainable by the use of high fidelity gage blocks, but in a small fractional part of the time required by proper usage of such gage blocks.

The mounting for the glass scale S1, Fig. 3, is incompletely shown, but includes the necessary quota of relatively opposed adjusting screws such as will enable shifting of the glass vertically as well as angular orientation of its row of graduations with respect to the second scale graduations S2. Light from any suitable source admitted through a hole in the cover plate 99, Fig. 3, of the glass scale S1 serves to illuminate the various scale indicia and value identifications.

I claim:

1. In a gage, a measuring member having a fiducial reference surface, a frame member adapted to rest against a base surface and having a guideway for the measuring member extending perpendicular to said reference surface, adjusting means mounted on one of the said members, a push rod movably guided on the other member but normally in fixed position thereon so that predetermined movement of the adjusting means can move the measuring member to approximate desired positions through a measuring unit distance, a handle connected to the adjusting means and operable by a single generally unidirectional movement of a human hand to move the measuring member, via the push rod, through said unit distance, a manually adjustable means on said other member connected for action on the push rod in a manner to effect precisional adjustments of the measuring member, a graduated scale on the measuring member, and a measuring microscope in scanning relationship to said scale and with index means related thereto in the field of vision of the microscope so as, optically, to enable an operator to adjust the reference surface positions relative to the base surface in minute increments representing fractions of said measuring unit distance.

2. The gage according to claim 1, wherein the measuring member has a plurality of substantially uniformly spaced apart reference step surfaces provided by a stack of high fidelity gage blocks supported in a rigid elongated metal holder movable on the guideway and having trough-defining surfaces holding the blocks in stacked relationship, and adjustable means exerting a substantially uniform predetermined pressure on the stack endwise of it toward one end of the trough in a manner to maintain the step surfaces of the blocks in fiducial relationship, the holder having means at said one end of the trough rigidly supporting the associated end of the stack against movement along the trough.

3. The gage according to claim 2, wherein each of the blocks as initially stacked into the holder, is oversize so that the stack has a total length substantially greater than the number of unit distances to be represened by the measuring bar steps, and the force exerted by the spring means is adjusted to reduce said total length and bring the steps into fiducial unit distance relationship.

4. In a gage, a measuring member having a fiducial reference surface, a frame member adapted to rest against a base surface and having a guideway for the measuring member extending perpendicular to said reference surface, a cam movably mounted on one of the said members, a cam follower movably guided on the other member but normally in fixed position thereon so that predetermined movement of the cam can move the measuring member to approximately desired positions through a measuring unit distance, a handle connected to the cam and operable by a single generally unidirectional movement of a human hand to move the measuring member, via the cam follower, through said unit distance, a manually adjustable screw in threaded engagement with said other member and disposed to act on the cam follower in a manner to effect precisional adjustments of the measuring member, a graduated scale on the measuring member, and a measuring microscope in scanning relationship to said scale and with index means related thereto in the field of vision of the microscope so as, optically, to enable an operator to adjust the reference surface positions relative to the base surface in minute increments representing fractions of said measuring unit distance.

5. A gage according to claim 4, wherein the cam and the handle are mutually integral and mounted on the frame member for angular movement to a fixed axis; the follower being mounted on the measuring member for rectilinear movement relative thereto generally in a direction normal to the base surface, the axis of the screw being disposed obliquely to the axis of the follower, whereby a single rotation of the screw has an adjustment output per single turn of the screw less than the axial spacing of its threads.

6. A gage according to claim 4, wherein a graduated scale on the frame member, associated with the handle, informs the operator of the approximate positions of the reference surface.

7. A gage according to claim 4, wherein the guideway for the measuring member comprises a plurality of mutually parallel substantially rigid surfaces, and a plurality of circular substantially rigid elements in preloaded tangential and frictional rolling engagement therewith.

8. The gage according to claim 7, wherein the guideway comprises a preloaded ball bearing gib.

9. In a gage a frame member adapted to rest against a base surface, a measuring bar supported on the frame member for movement toward and away from such surface and having a series of reference steps, each spaced from an adjacent step substantially exactly one linear measuring unit, such as an inch, means adapted for manual operation and capable of moving the measuring bar quickly through predetermined fractional portions of the measuring unit and/or the whole unit distance for initial setting of the reference steps, said means including a manual adjustment device operative precisionally to modify any initial setting of the steps, a scale in fixed relationship to the measuring bar and having a series of measuring unit fraction identifying graduations spaced apart substantially uniformly lengthwise of the measuring bar, a microscope on the frame member disposed to display magnified images of the scale graduations successively as the measuring bar is moved through said unit distance, the microscope having transparent means transverse to its optical axis visible through its eyepiece and bearing an indicia capable, when in register with a scale graduation, of indicating and identifying in the field of view movements of said scale corresponding to coordinated movements of the reference steps, the microscope further including manually adjustable cam and additional scale means settable, in advance of operation of said precisional adjustment device to cause such registration of graduations and indicia in a manner to modify the apparent step set readings indicated by the registration predetermined amounts corresponding to actual step positions.

10. The gage according to claim 9, wherein the measuring bar is supported on the frame member through a preloaded ball bearing gib.

11. In a gage, a frame member adapted to rest against a base surface, a measuring bar movable on the frame member toward and away from such surface and having a series of reference steps, each spaced from an adjacent step substantially exactly one linear measuring unit, such as an inch, means adapted for manual operation and capable of moving the measuring bar quickly through predetermined fractional portions of the measuring unit, and/or the whole unit distance, for initial setting of reference steps, said means including a manual adjustment device operative provisionally to modify any initial setting of the steps, a first scale in fixed relationship to the measuring bar and having a series of measuring unit fraction identifying graduations spaced apart uniformly lengthwise of the measuring bar, a microscope on the frame member disposed to display through its eyepiece magnified images of the first scale graduations successively as the measuring bar is moved through said unit distance, the microscope having transparent means transverse to its optical axis visible through its eyepiece and bearing a second scale having a plurality of evenly spaced reference indicia thereon capable of indicating and identifying a series of minute actual movements of the first scale for subdivision of its graduation spaces incident to precisional movement of the reference steps, the microscope further including manually adjustable cam and third scale means settable, in increments representing fractions of the subdivisions and in advance of operation of said precisional adjustment device to cause such selective registration of first scale images and second scale indicia, in a manner to modify the apparent step set readings indicated by such registration predetermined amounts corresponding to actual step positions.

12. In a height gage, a frame member adapted to rest against a base surface, a measuring bar movable vertically on the frame member and having a rigid trough containing a stack of gage blocks therein, alternate ones of which project horizontally past the others to provide a series of readily accessible reference steps, each spaced from an adjacent step substantially exactly one linear measuring unit, such as an inch, means adapted for manual operation and capable of moving the steps quickly through predetermined fractional portions of an entire measuring unit distance for initial setting of the reference steps, said means including a manual adjustment device operative precisionally to modify any initial setting of the steps, a scale in fixed relationship to the measuring bar and having a series of unit fraction identifying graduations spaced apart uniformly lengthwise of the measuring bar, and a measuring microscope in fixed position on the frame member and disposed to display magnified images of the scale graduations successively as the measuring bar is moved through said unit distance.

13. The height gage according to claim 12, wherein each of the blocks, as initially stacked into the trough, is oversize so that the stack has a total height substantially greater than should correspond to its number of steps, and adjustable spring means carried by the trough exerting sufficient force vertically against one end of the stack to bring the steps into fiducial unit distance relationship.

14. The height gage according to claim 12, wherein the measuring bar and the frame member have, rigid therewith respectively, two pairs of mutually parallel substantially rigid surfaces extending vertically in horizontally spaced apart relationship, and a plurality of circular substantially rigid elements between each pair of surfaces which are in preloaded tangential rolling engagement therewith.

15. In a height gage, a frame member adapted to rest against a base surface, a measuring bar guided for movement vertically on the frame member by a preloaded ball bearing gib, means on the measuring bar providing a series of readily accessible operatively rigid reference steps, each spaced from an adjacent step substantially exactly one linear measuring unit, such as an inch, means adapted for manual operation and capable of moving the steps quickly through predetermined fractional portions of an entire measuring unit distance for initial setting of the reference steps, said means including a manual adjustment device operative precisionally to modify any initial setting of the steps, a scale in fixed relationship to the measuring bar and having a series of unit fraction identifying graduations spaced apart uniformly lengthwise of the measuring bar, and a microscopic reader means in fixed position on the frame member in scanning relationship to graduations of the scale.

No references cited.